Patented Nov. 29, 1949

2,439,471

UNITED STATES PATENT OFFICE 2,489,471

COOKING UTENSIL

James Sebold Vanick, Westfield, N. J., and Edward James Bothwell, New Brighton, N. Y., assignors to The International Nickel Company, Inc., New York, N. Y., a corporation of Delaware No Drawing. Application October 10, 1945, Serial No. 621,614. In Canada September 5, 1945

4 Claims. (Cl. 75—128)

The present invention relates to food cooking utensils and more particularly to food cooking utensils made of cast iron.

Cast iron cooking utensils have been made heretofore. However, these utensils lacked the combination of essential and desired properties. Thus, they did not have the essential resistance to staining and attack by foods, combined with resistance to warping and distortion, resistance to sticking of foods and ability to clean easily while at the same time being free from elements which contaminate or detrimentally affect certain foods and thereby affect the health of the consumer. By "staining" is meant a surface discoloration produced by foods which usually appears as a strongly adherent film on the utensil. The term "attack by foods" refers to the pitting and/or roughening produced by foods which is generally attributed to dissolution of the metal into the food. When cast iron cooking utensils are attacked by food, they become roughened and pitted with use, resulting in the contamination of the food due to the lodging of previously cooked food in the pits where it decays, and resulting in the sticking of the food to the roughened surface of the utensil. In addition to possessing resistance to roughening and pitting by foods, food cooking utensils must also possess resistance to warping and distortion caused by repeated heating of the utensil, resistance to sticking of foods and the ability of being kept clean of foods. Resistance to warping and distortion is essential. Warping or distortion of the utensil detrimentally affects the quality and appearance of the food cooked therein and has a marked detrimental effect upon the efficiency of cooking utensils in contact with a hot heating surface. Cast iron for use as food cooking utensils must be capable of being cast as a dense product, must be capable of being polished to a high degree, and must not be brittle. Denseness and the ability to take and retain a high polished finish are important in order to eliminate pores, irregularities in the relatively rough cast surface and fine interstices, in which pores, irregularities and fine interstices food may lodge and decay. The absence of brittleness is important in order that the utensil withstand handling and processing during its production into the finished article and in order that the utensil have high resistance to fracturing, such as by thermal or mechanical impact. The utensil should also be resistant to burning of foods, retain a clean metal surface, be resistant to the heat effects of the flame or heating media, have resistance to wear, and have the necessary strength and other physical, chemical and metallurgical properties to withstand the conditions encountered in use and to contribute long life. Although many attempts have been made to provide cooking utensils made of cast iron, none, as far as we are aware, has been completely successful when carried into actual practice. A very commonly tried method has been chromium-plating, but this method has been unsuccessful. The chromium-plating tends to peel off with the resulting hazard of serious injury due to the presence of razor-sharp particles of the plating in the food. Furthermore, the plating inevitably wears off, thereby exposing the base metal and accelerating localized attack which in turn undermines the plating and accelerates further peeling thereof. Likewise, enameling and like coatings are unsatisfactory. The tendency of such coatings to chip presents the danger of injury due to the sharp chips. In addition, when chipping occurs, the base metal is exposed and is subject to localized attack. Because of the thickness of enamel-like coatings, when chipping occurs, the recessed, chipped areas present greater opportunity for food to lodge and decay therein.

We have discovered improved cast iron cooking utensils which are free from the disadvantages and short-comings of prior cast iron utensils, and which are capable of giving satisfactory, commercially acceptable service in actual and practical use.

It is an object of the present invention to provide improved cooking utensils made of cast iron.

It is another object to provide cast iron cooking utensils having markedly improved resistance to attack and staining by food products combined with high resistance to warping, distortion and cracking, high resistance to sticking of foods, the ability of being easily cleaned and improved ability to attain and retain a high finish.

It is still another object of the invention to provide cooking utensils made of cast iron having a special composition and containing nickel, chromium, and silicon as essential elements.

It is a further object to provide cooking utensils made of a special nickel-chromium-silicon cast iron and having the combination of properties described hereinbefore.

Other objects and advantages of the invention will become apparent from the following description.

In general, the present invention contemplates cooking utensils made of austenitic cast iron containing carbon and alloying elements in the following amounts:

| Element: | Percentage |
| --- | --- |
| Total carbon | 1.5 to 2.8 |
| Silicon | 5.0 to 7.0 |
| Nickel | 25.0 to 40.0 |
| Chromium | 4.0 to 7.0 |

The balance will be iron except for small amounts of the usual minor constituents and impurities such as manganese, sulfur, phosphorus, and so forth. Thus, the cast iron may contain about 0.4% to 1.5% manganese, usually about 0.5% to 0.8% manganese, up to 0.2% sulfur, up to 1% phosphorus, etc. In general, the sum of the minor constituents and impurities will not exceed 3% in all. It is essential that silicon, nickel and chromium be present in the cast iron. If any of these elements are omitted or are included in amounts substantially less than the minimum amounts specified hereinbefore, the essential combination of properties is no longer obtained. If the chromium content is increased to more than 7%, the utensils become excessively brittle and unmachinable. The silicon content should not exceed 7% because when this amount is exceeded, the cast iron utensils become too brittle. Up to about 1.2% of the total carbon may be present as combined carbon, and the balance of the carbon is present in the graphitic form. Because of the presence of flake graphite, the compositions have been referred to as cast irons. The presence of graphitic carbon, in combination with the nickel, chromium and silicon, imparts improved thermal properties which assure resistance to sticking of foods and resistance to warping and cracking. The total carbon content is preferably higher, within the aforementioned range, the thinner the section size of the utensil. Thus, when the average section size of the cast iron is about 0.1 inch, the total carbon content is preferably about 2.6%, whereas when the average section size is about 0.75 inch, the total carbon content is preferably about 2.0%.

In carrying the invention into practice, it is preferred to make the cooking utensils of cast iron containing the following elements in the amounts indicated:

| Element: | Percentage |
| --- | --- |
| Total carbon | 1.8 to 2.6 |
| Graphitic carbon | 0.6 to 2.3 |
| Combined carbon | 0.3 to 1.2 |
| Silicon | 5.5 to 6.5 |
| Nickel | 28.0 to 32.0 |
| Chromium | 4.5 to 5.5 |

The balance of the composition is substantially all iron, but does not exclude the aforementioned small amounts of minor constituents and impurities usually present in cast irons.

It is preferred that the carbon content not be less than 1.8% as amounts below that figure tend to result in cast utensils having decreased machinability, reduced toughness and greater shrinkage during freezing. Carbon contents within the range of 1.8% to 2.6% produce dense cast utensils and give good founding characteristics. It is preferred that the chromium content not exceed 5.5% as larger amounts increase the hardness and the brittleness and decrease the machinability of the utensils. Optimum resistance to staining and attack by food is obtained with nickel contents within the range of 28% to 32%. The advantages gained by exceeding 32% nickel generally do not outweigh the cost of the additional nickel.

Cooking utensils and other food processing utensils made of the cast irons contemplated by the invention and described hereinabove have improved resistance to attack and staining by foods. They attain and retain a high polish, thus preventing pits, fine interstices, etc., in which food may lodge and decay. The polish attained and retained by the utensils is markedly higher than has been attainable heretofore in cast iron cooking utensils. The utensils provided by the present invention also retain a clean, smooth metal surface which resists burning and sticking of foods. They are characterized further by improved resistance to heat effects, such as warping and distortion, compared particularly with wrought metal cookware. The utensils possess vastly superior resistance to rusting than other cast iron cooking utensils employed heretofore. This improved combination of properties and characteristics is obtained in cooking utensils without the use of elements which are understood to contaminate certain foods.

Cast irons containing the following amounts of alloying elements, in addition to carbon, iron and small amounts of the usual incidental elements present in cast iron, are illustrative of compositions contemplated by the invention:

| No. | Percent Si | Percent Ni | Percent Cr |
| --- | --- | --- | --- |
| 1 | 6.0 | 30.0 | 5.0 |
| 2 | 6.7 | 30.3 | 4.8 |
| 3 | 6.3 | 29.5 | 5.3 |
| 4 | 5.8 | 34.7 | 5.5 |
| 5 | 6.3 | 39.5 | 5.2 |

In order that those skilled in the art may have a better appreciation of the improved properties possessed by the food processing utensils contemplated by the invention, the following example is given.

*Example*

A skillet was made in accordance with the present invention of cast iron having the following composition:

| Element: | Percentage |
| --- | --- |
| Total carbon | About 2.5 |
| Graphitic carbon | About 1.9 |
| Combined carbon | About 0.6 |
| Silicon | About 6.0 |
| Nickel | About 30.0 |
| Chromium | About 5.0 |
| Manganese | About 0.8 |
| Sulfur | About 0.1 |
| Phosphorus | About 0.1 |
| Iron, balance. | |

The cast skillet was polished on the inside to a bright smooth finish. Without any subsequent protective or other special treatment, the skillet was placed in service. After general household usage as a cooking utensil for a period of more than one year, involving an average use of at least twice a week, the skillet still retains a bright smooth finish, despite the fact that during this entire period the skillet was never scoured to remove stains, and is in excellent condition. It is free from pitting and other evidences of attack by food, was easily kept clean without scouring, has not stained or warped, and food prepared therein cooked uniformly and did not burn or stick to the skillet.

The food cooking utensils contemplated by the present invention include skillets, frying pans or spiders, dutch ovens, chicken fryers, broiling pans and grids, griddles, hot plates, waffle irons, casseroles, and the like. The utensils provided by the invention are applicable not only to general home or household usage but also to institutional uses, such as in restaurants, hotels, hospitals, ships' galleys, railroad dining cars, etc. As will be apparent to those skilled in the art, the handles and other appendages of the cooking utensils can be made of the same compositions or may be made of other metal compositions, wood, plastics, etc.

Although the present invention has been described in conjunction with preferred embodiments, it is to be understood that variations and modifications may be resorted to without departing from the spirit and scope of the invention, as those skilled in the art will readily understand. Such variations and modifications are considered to be within the purview and scope of the invention and the appended claims.

We claim:

1. A food cooking utensil comprised of a metallic portion adapted to hold food on one surface and to be subjected to heat on the other surface to cook said food, said metallic portion being made of cast iron containing about 1.8% to 2.6% total carbon, 0.6% to 2.3% of said carbon being in the graphitic form, 5.5% to 6.5% silicon, 28% to 32% nickel, 4.5% to 5.5% chromium, and the balance substantially all iron.

2. A food cooking utensil comprised of a metallic heat conducting portion subjected on one side to heat and on the opposite side to the influence of food while cooking said food, said portion being made of an alloy containing about 1.8% to 2.8% total carbon, 0.6% to 2.3% of said carbon being in the graphitic form, 5% to 7% silicon, 28% to 32% nickel, 4% to 5.5% chromium, and the balance substantially all iron.

3. A food cooking utensil comprised of a metallic heat conducting portion subjected on one side to heat and on the opposite side to the influence of food while cooking said food, said portion being made of an alloy containing about 1.5% to 2.8% total carbon, up to 1.2% of said carbon being in the combined form and the balance being in the graphitic form, 5% to 7% silicon, 25% to 40% nickel, 4% to 7% chromium, and the balance substantially all iron.

4. A food cooking utensil comprised of a metallic portion adapted to hold food on one surface and to be subjected to heat on the other surface to cook said food, said metallic portion being made of cast iron containing about 1.5% to 2.8% total carbon, up to 1.2% of said carbon being in the combined form and the balance being in the graphitic form, 5% to 7% silicon, 25% to 40% nickel, and 4% to 7% chromium, said cooking utensil being characterized by improved resistance to staining and attack by foods, high resistance to sticking of foods, high resistance to warping, distortion and cracking, the ability of being easily cleaned and improved ability to take and retain a high finish.

JAMES SEBOLD VANICK.
EDWARD JAMES BOTHWELL.

REFERENCES CITED

The following references are of record in the file of this patent:

UNITED STATES PATENTS

| Number | Name | Date |
|---|---|---|
| 1,626,248 | Merica et al. | Apr. 26, 1927 |
| 2,171,040 | Merritt et al. | Aug. 29, 1939 |

FOREIGN PATENTS

| Number | Country | Date |
|---|---|---|
| 378,508 | Great Britain | Aug. 15, 1932 |
| 461,534 | Great Britain | Feb. 18, 1937 |